H. E. CARNER.
DRAWBAR FOR TRACTORS.
APPLICATION FILED MAR. 3, 1919. RENEWED OCT. 6, 1921.
1,398,416.
Patented Nov. 29, 1921.
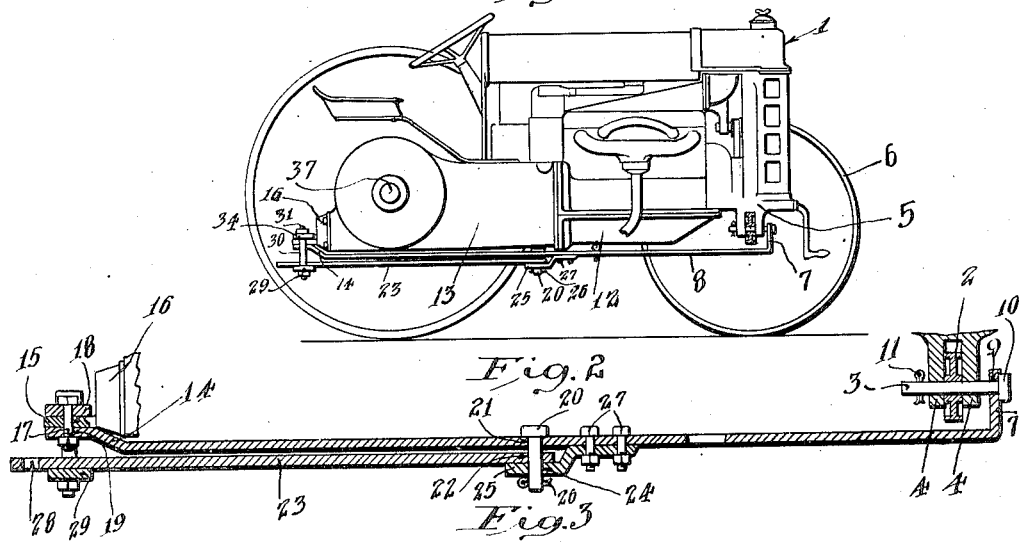
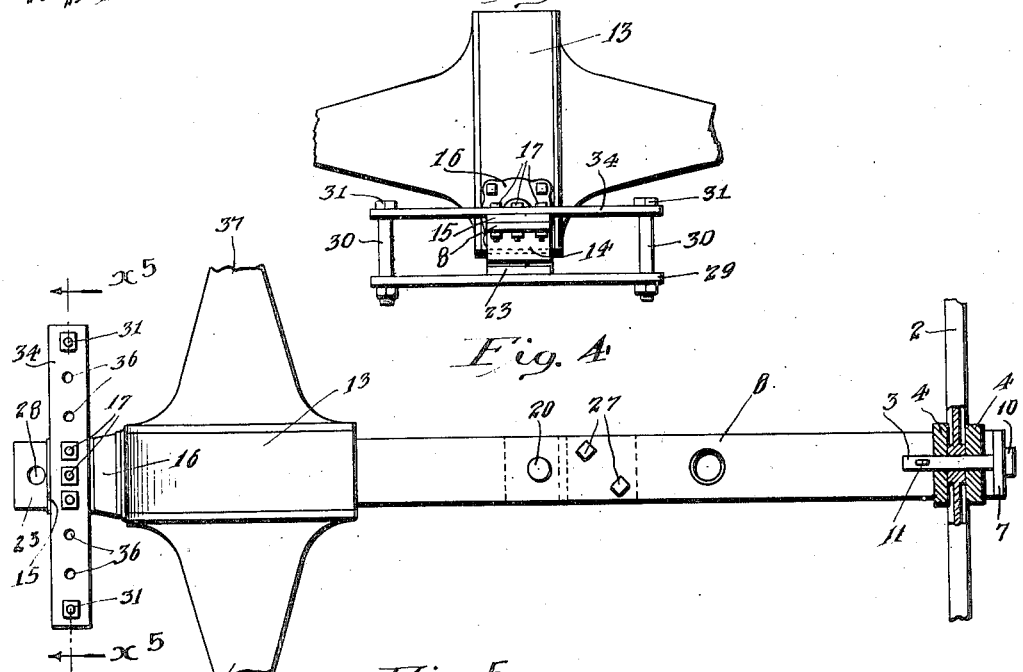
Witnesses:
Sully Russo
Rita A. Alton
Inventor
Henry E. Carner
By Frederick Whyou atty

UNITED STATES PATENT OFFICE.

HENRY E. CARNER, OF ANAHEIM, CALIFORNIA.

DRAWBAR FOR TRACTORS.

1,398,416.   Specification of Letters Patent.   Patented Nov. 29, 1921.

Application filed March 3, 1919, Serial No. 280,459. Renewed October 6, 1921. Serial No. 505,925.

*To all whom it may concern:*

Be it known that I, HENRY E. CARNER, a citizen of the United States, residing at Anaheim, in the county of Orange, State of California, have invented a new and useful Drawbar for Tractors, of which the following is a specification.

This invention pertains to drawbars of the character designed to connect tractors with the implements or vehicles which are drawn by the tractors and an object of the invention is to make provision for so connecting the implement or vehicle with the tractor that maximum tractive effect of the tractor will be produced when the tractor is operated.

Another object of the invention is to provide a drawbar which will produce a downward pull on the front end of the tractor so as to prevent the front wheels of the tractor from rising off the ground.

Another object is to provide a draw bar whereby, when the tractor is turning to the right or left, the resistance of the load to the pull of the tractor in the turning operation will aid in turning the tractor instead of tending to prevent turning as with many constructions of drawbars now in use.

Other objects and advantages will appear in the subjoined detailed description.

The accompanying drawings illustrate the invention:

Figure 1 is a side elevation of a tractor equipped with my improved drawbar, the wheels of the near side of the tractor being omitted and the front axle being shown in vertical mid section for clearness of illustration.

Fig. 2 is an enlarged longitudinal mid section of the drawbar, fragments of the front and rear portions of the tractor also being shown.

Fig. 3 is an enlarged fragmental rear elevation of Fig. 1.

Fig. 4 is an enlarged plan view of the drawbar, fragments of the front and rear portions of the tractor also being shown, partly in section.

Fig. 5 is a sectional elevation on line indicated by $x^5$—$x^5$, Fig. 4.

The tractor is indicated in general by the character 1 and it is understood that the invention may be used in connection with any tractor of the general type of that shown in Fig. 1. In this instance, the tractor 1 is of the type known to the trade as the "Fordson". In this type of tractor the front axle 2 of the tractor is pivotally connected by a bolt 3 to lugs 4 projecting downwardly from the cylinder front cover 5. It is understood that the axle 2 is thus pivoted to swing vertically so that the front wheels 6 of the tractor can readily accommodate themselves to irregularities of the ground over which the tractor runs.

The pin 3 also serves to connect the forward portion of the tractor to the upwardly bent forward end 7 of a bar 8, said upwardly bent end having a perforation 9 through which the pin 3 passes. The front end of the pin 3 is provided with a head 10 and the projecting rear end of the pin 3 is provided with a cotter pin 11 to prevent withdrawal of the pin 3. The bar 8 extends rearwardly in the vertical axial plane of the tractor beneath the crank case 12 and transmission housing 13 and said bar near its rear end is provided with an upwardly and rearwardly bent portion 14 so that the rear end of the bar 8 will lie directly beneath and close to a rearwardly projecting lug 15 of the drawbar cap 16, said lug 15, in this instance, being the ordinary or usual drawbar on the "Fordson" tractor. Bolts 17, pass through holes 18 in the lug 15 and also through holes 19 in the rear end portion of the bar 8 so as to firmly secure said bar to the rear end of the tractor. When the rear end of the bar 8 is thus secured to the rear end of the tractor, the upwardly bent front end 7 is spaced from the forwardmost lug 4 so that any pull transmitted to the bar 8 will not be transmitted by said bar to the lug 4 but to the bolts 17 and by said bolts to the rear end of the tractor.

The bar 8 is provided approximately at its middle with a pivot in the form of a headed pivot or pin 20 which passes through a perforation 21 in said bar. The pivot 20 engages a perforation 22 in a rearwardly extending arm 23 which is thus pivotally connected to the bar 8. The pin 20 also passes through a perforation 24 in a plate 25 which forms a bearing for the pivot pin 20, there being a cotter pin 26 through the lower projecting end of the pin 20 beneath the plate 25 to prevent the pin 20 from becoming detached from the plate 8 and arm 23. The plate 25 is fastened by bolts 27 or their equivalents to the bar 8.

The rear end of the arm 23 is provided with an eye 28 whereby the arm 23 may be connected with a plow, cultivator or any other agricultural implement or with a vehicle, which is to be drawn by the tractor. To slidably support the rear end of the arm 23 said rear end may rest upon a transversely extending member in the form of a bar 29, and said member is provided at its ends with stops to limit lateral motion of the arm 23. In this instance said stops comprise tubular members 30 through which pass bolts 31, said bolts also passing through perforations 32 in the member 29 and through other perforations 33 in a second transversely extending member 34 that is also in the form of a bar. The tubes 30 also function as spacing members to space the transverse members 29, 34 the desired distance from one another. The transverse member 34 rests upon the lug 15 and is provided with perforations 35 to receive the upper ends of the bolts 17, which bolts thus serve to fasten the transverse member 34 to the rear end of the tractor. The transverse members 29, 34 are provided with other perforations 36 so that, if it be desired to shorten the transverse movement of the arm 23, the bolts 31 may be removed from the perforations 32, 33 and placed selectively in the perforation 36, the spacing members 30 at the same time being placed on the bolts 31 as said bolts are being placed in the new positions.

Assuming that the bar 8 and member 34 have been connected to the tractor as above described, and that the implement or vehicle to be drawn has been connected with the eye 28 of the arm 23, the invention operates as follows: When the tractor is driven straight ahead over the ground, the pull of the load comes upon the arm 23 and is transmitted to the pin 20 and from said pin to the bar 8. That portion of the bar 8 extending from the pin 20 to the bolts 17 is put in compression and thus it is clear that the pull of the load is transmitted to the rear of the tractor, the same as if the load were attached in the usual way to the lug 15.

Ordinarily with this type of tractor when the load becomes excessive, for example if the implement being drawn is a plow and strikes a hard stretch of ground, the pull on the lug 15 tends to swing the rear end of the tractor downward around the rear axle 37, thus causing the front portion of the tractor to swing upward around the axle 37. When this newly invented drawbar is used, however, the downward pull on the rear end of the arm 23 is more than counterbalanced by the weight of the forward end of the tractor which tends to hold the forward end of the bar 8 downward, the weight of the forward end of the tractor being transmitted through the pin 3 to the bar 8 to prevent any tendency to raising of the forward end of the arm 23. It is understood that the pin 20 can be positioned nearer the front end or nearer the rear end of the bar 8. The nearer the rear end the pin 20 is positioned, the less effective will be the weight of the tractor to hold the front end against upward swinging and, the nearer the pin 20 is to the forward end of the bar 8, the more effective will become the weight of the tractor to prevent upward swinging of the front end of the tractor. The advantage of having the pivot 20 substantially mid-way between the pin 3 and bolts 17 is that when the tractor is steered to the right or left the pull is first transmitted by the arm 23 to a point substantially midway between the front and rear axles so that the tractor will tend to swing horizontally in a circular path about the pin 20. Thus it is clear that the pin 20 should be located forwardly of the axle 37. The stops 30 prevent the arm 23 from swinging too far away from the axis of draft of the tractor.

It is understood that the invention is not limited in its broader phases to the exact details of construction described above and shown in the accompanying drawings, but that such changes and modifications are included as lie within the spirit and scope of the appended claims.

I claim:

1. The combination with the front axle pivot pin of a tractor, of a bar pivoted to the tractor by said pivot pin, means connecting the rear end of the bar with the rear end of the tractor, and an arm pivoted to the bar at a point forwardly of the rear axle of the tractor.

2. The combination with a tractor having a front axle pivot pin and an ordinary drawbar, of a bar engaging the pivot pin, bolts connecting the bar with the ordinary drawbar, and an arm pivoted to the bar between the bolts and pivot pin.

3. The combination with a tractor having a front axle pivot pin and an ordinary drawbar, of a bar engaging the pivot pin, bolts connecting the bar with the ordinary drawbar, an arm pivoted to the bar between the bolts and pivot pin, a bar extending transversely beneath the rear end of the arm and means in conjunction with the bolts for connecting the transversely extending bar with the ordinary drawbar.

4. A draw bar construction for tractors comprising means for supporting a stud beneath the forward end of the transmission case of the tractor, means for bracing the stud, and a bar pivotally connected to the stud and extending backwardly beyond the rear axle.

5. A draw bar construction for tractors comprising means for supporting a stud beneath the forward end of the transmission case of the tractor so that the stud will extend downwardly at a point in front of the rear axle, and a bar connected to the stud and adapted for connection to a farm implement.

6. A draw bar construction for tractors comprising a cross bar adapted to be mounted behind and below the rear axle, means for supporting a stud beneath the forward end of the transmission case of the tractor so that the stud will extend downwardly at a point in front of and below the rear axle, a brace connecting the stud to the crossbar, and a bar pivotally mounted upon the stud and extending backwardly beyond the rear axle.

7. A draw bar construction for tractors comprising a bar having an upwardly bent forward end provided with a perforation adapted to be engaged by the front axle bolt of the tractor, there being a perforation in the rear end of the bar to register with one of the bolt holes in the lug of the drawbar cap of the tractor, a stud projecting downwardly from near the middle of the bar, and a second bar pivotally mounted on the stud and extending backwardly beyond the rear axle.

Signed at Los Angeles, California, this 21st day of February, 1919.

HENRY E. CARNER.

Witnesses:
GEORGE H. HILES,
L. BELLE WEAVER.